United States Patent [19]
Wenger et al.

[11] Patent Number: 5,351,561
[45] Date of Patent: Oct. 4, 1994

[54] CORIOLIS-TYPE FLOW METER HAVING AN IMPROVED TEMPERATURE RANGE OF OPERATION

[75] Inventors: Alfred Wenger, Neftenbach; Ennio Bitto, Aesch, both of Switzerland

[73] Assignee: Endress+Hauser Flowtec AG, Switzerland

[21] Appl. No.: 116,374

[22] Filed: Sep. 3, 1993

[30] Foreign Application Priority Data

Nov. 6, 1992 [EP] European Pat. Off. ........ 92810859.6

[51] Int. Cl.⁵ .............................................. G01F 1/84
[52] U.S. Cl. ............................................... 73/861.38
[58] Field of Search .............. 73/861.37, 861.38, 32 A

[56] References Cited

U.S. PATENT DOCUMENTS

| | | | |
|---|---|---|---|
| 4,217,774 | 8/1980 | Agar | 73/32 A |
| 4,422,338 | 12/1983 | Smith . | |
| 4,653,332 | 3/1987 | Simonsen | 73/861.38 |
| 4,793,191 | 12/1988 | Flecken et al. | 73/861.38 |
| 4,801,897 | 1/1989 | Flecken | 73/861.38 |
| 5,157,975 | 10/1992 | Tanaka et al. | 73/861.38 |

FOREIGN PATENT DOCUMENTS 63-233328 9/1988 Japan .
2167858 6/1986 United Kingdom .
2194324 3/1988 United Kingdom .

OTHER PUBLICATIONS

B. Vögtlin et al., "Direct Measurement of Mass Flow Using the Coriolis Force," Endress+Hauser Flowtec AG, Switzerland, pp. 1–8, date unknown.

Primary Examiner—Richard E. Chilcot, Jr.
Assistant Examiner—Harshad Patel
Attorney, Agent, or Firm—Barnes & Thornburg

[57] ABSTRACT

A Coriolis principle mass flow meter is provided which is insertable into a conduit of a given diameter so as to be axially aligned with the conduit and through which flows a fluid to be measured. The flow meter includes two measuring tubes each having the same inner diameter and the same wall thickness. The two measuring tubes are coupled to an inlet manifold and an outlet manifold. The inlet and outlet manifolds are coupled to an external support tube. The flow meter also includes an internal supporting element that is parallel to the measuring tubes. Opposite ends of the internal supporting element are coupled to the inlet manifold and outlet manifold, respectively. The internal supporting element has a thermal transition resistance to the fluid which is lower than the thermal transition resistance of the external support tube to the fluid.

10 Claims, 1 Drawing Sheet

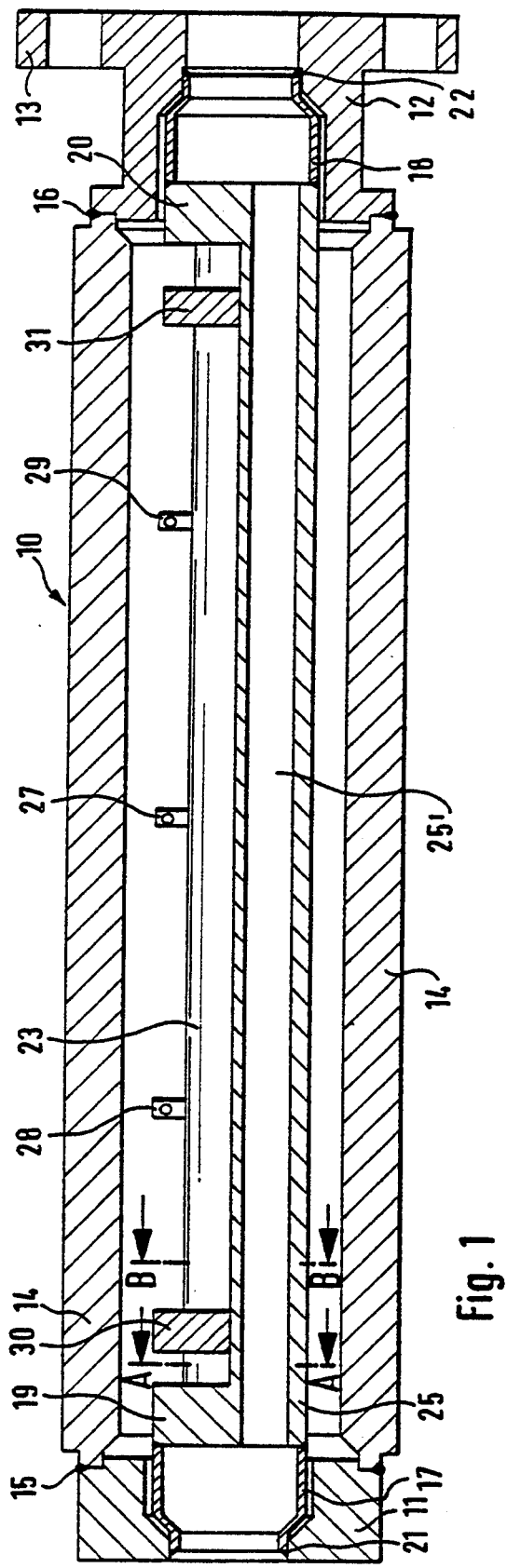
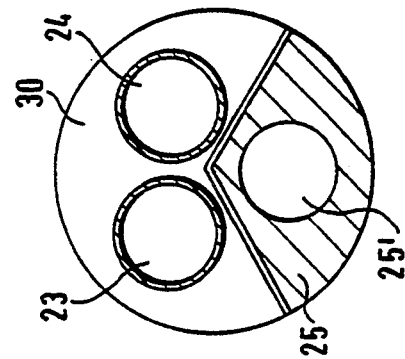
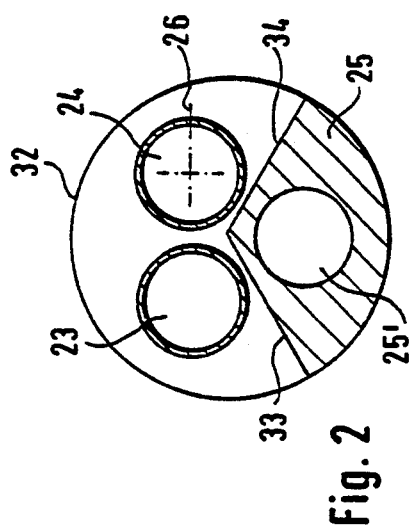

CORIOLIS-TYPE FLOW METER HAVING AN IMPROVED TEMPERATURE RANGE OF OPERATION

FIELD OF THE INVENTION

The present invention relates to a mass flow meter working on the Coriolis principle, comprising two straight, parallel measuring tubes as vibrating bodies through which flows a fluid to be measured.

BACKGROUND OF THE INVENTION

U.S. Pat. No. 4,793,191, assigned to Endress & Hausen Flowter A. G. which is incorporated herein by reference, describes a mass flow meter working on the Coriolis principle
—which is insertable into a conduit of a given diameter so as to be axially aligned with said conduit, through which flows a fluid to be measured,
—with an inlet tube and an outlet tube,
—which serve to connect the mass flow meter with the conduit,
—with an inlet manifold and an outlet manifold,
—with an external support tube
—whose ends are fixed to the inlet tube and outlet tube, respectively,
—with two annular diaphragms
—via which the inlet and outlet tubes are connected to the inlet manifold and outlet manifold, respectively,
—with two parallel, straight measuring tubes of the same inner diameter and the same wall thickness each having its two ends fixed in the inlet manifold and outlet manifold, respectively,
—with a vibration exciter
—which excites the measuring tubes into sympathetic vibrations,
—with two sensors spaced along the measuring tubes for sensing their vibrations,
—with driver electronics for the vibration exciter, and
—with evaluation electronics
—which determine the mass flow rate from the phase difference of the sensor signals and/or the density of the fluid from the vibration frequency.

For various reasons, e.g., because of the sensitivity of the mass flow meter to vibrations originating from the conduit or because of the dependence of the measurement result on the pressure of the fluid, the diaphragms in this prior art mass flow meter cannot be made arbitrarily soft but must have a given minimum stiffness.

Since changes in the temperature of the fluid result in inhomogeneous temperature distributions in the mass flow meter, they cause stress in the vibrating measuring tubes and in the diaphragms. If this stress reaches values above the yield point of the diaphragm, irreversible plastic deformation will take place, which irreversibly changes the characteristics of the vibrating system, so that recalibration of the mass flow meter will be necessary.

The arrangement described in U.S. Pat. No. 4,653,332 seeks to solve the problem just described by means of compensating tubes. This arrangement is a mass flow meter working on the Coriolis principle
—which is insertable into a conduit of a given diameter through which flows a fluid to be measured,
—with an inlet tube and an outlet tube
—which are combined to form a central connection unit and serve to provide such a connection with the conduit
—that the axis of the mass flow meter and that of the conduit do not coincide,
—with a first straight compensating tube, which is connected with the inlet tube, and a second straight compensating tube, which is connected with the outlet tube,
—the two compensating tubes extending in opposite directions and being axially aligned,
—with two straight measuring tubes which are parallel to each other and to the compensating tube such
—that the axes of said four tubes lie in one plane,
—with manifolds for respectively connecting the first and second compensating tubes with the ends of the measuring tubes,
—with a supporting tube fixed to the central connection unit,
—with a vibration exciter
—which excites the measuring tubes into sympathetic vibrations,
—with two sensors spaced along the measuring tubes for measuring the vibrations of the latter,
—with driver electronics for the vibration exciter, and
—with evaluation electronics
—which determine the mass flow rate from the phase difference of the sensor signals and/or the density of the fluid from the vibration frequency.

Since the axis of this prior art mass flow meter is not aligned with the axis of the conduit, the fluid must change its direction of flow twice by 90° in the central connection unit and by 180° in each of the manifolds, which may cause turbulences and cavitation problems. This mass flow meter therefore gives away the valuable advantage of the first-explained mass flow meter, in which the fluid does not change its direction of flow, since the axis of the conduit is aligned with that of the mass flow meter.

The invention as claimed serves to increase the resistance to cyclic temperature stress and the resistance to thermal shock of the first-explained mass flow meter, and thus to expand the usable temperature range of this flow meter.

SUMMARY OF THE INVENTION

Accordingly, the invention consists in a mass flow meter working on the Coriolis principle
—which is insertable into a conduit of a given diameter so as to be axially aligned with said conduit, through which flows a fluid to be measured,
—with an inlet tube and an outlet tube,
—which serve to connect the mass flow meter with the conduit,
—with an inlet manifold and an outlet manifold,
—with an external support tube
—whose ends are fixed to the inlet tube and outlet tube, respectively,
—with two connecting pieces
—via which the inlet and outlet tubes are connected with the inlet manifold and outlet manifold, respectively,
—with two parallel, straight measuring tubes of the same inner diameter and the same wall thickness each having its two ends fixed in the inlet manifold and outlet manifold, respectively,
—with a straight, internal supporting element —whose axis is parallel to that axis of symmetry of the measuring tubes which lies in the plane containing the axes of the measuring tubes, —whose ends are fixed in the inlet manifold and outlet manifold, respectively, and —whose thermal transition resistance to the fluid is substantially lower than the thermal transition resistance from the support tube to the fluid, —with a vibration exciter —which excites the measuring tubes into sympathetic vibrations, —with at least two sensors spaced along the measuring tubes for sensing their vibrations, —with driver electronics for the vibration exciter, and —with evaluation electronics —which determine the mass flow rate from the phase difference of the sensor signals and/or the density of the fluid from the vibration frequency.

According to one advantageous aspect of the invention, the axial stiffness of the supporting element is at least two times, preferably ten to twenty times, greater than that of the measuring tubes.

According to another advantageous aspect of the invention, the supporting element has an axial through hole and an inner diameter which is equal to that of the measuring tubes and through which the fluid flows, with the wall thickness of the supporting element along its circumference being preferably not constant. Advantageously, the wall thickness of the supporting element at the side remote from the measuring tubes is considerably greater than at the side adjacent to the measuring tubes.

According to a further advantageous aspect of the invention, the axis of the hole through the supporting element is equidistant from the axes of the two measuring tubes. Preferably, the distance between the axes of the two measuring tubes is equal to their respective distance from the axis of the hole through the supporting element.

According to still another advantageous aspect of the invention, the supporting element is a heat pipe.

According to a still further advantageous aspect of the invention, the measuring tubes are excited by the vibration exciter into antiphase flexural vibrations in the plane containing the axes of the measuring tubes.

BRIEF DESCRIPTION OF THE DRAWINGS

The invention will now be explained in greater detail with reference to the accompanying drawing, which shows schematically the mechanical portion of one embodiment of the invention.

FIG. 1 is a sectional side view of the mechanical portion of a mass flow meter;

FIG. 2 is a section taken along line A—A of FIG. 1, and

FIG. 3 is a section taken along line B—B of FIG. 1.

DETAILED DESCRIPTION OF THE DRAWINGS

Referring to FIG. 1, there is shown a sectional side view of the mechanical portion of a mass flow meter 10 which is insertable into a conduit of a given diameter (not shown to simplify the illustration) so as to be axially aligned with this conduit, through which flows a fluid to be measured. The mass flow meter 10 has an inlet tube 11 and an outlet tube 12, which serve to connect it with this conduit. This connection can be made, for example, by means of flanges 13, as shown in FIG. 1 at the right, or otherwise, as indicated in FIG. 1 at the left by the absence of any further modification.

The outer portions of inlet tube 11 and outlet tube 12 are fixed to the respective ends of a solid external support tube 14, as is indicated by the respective soldered, brazed, or welded joints 15, 16.

The inner portions of inlet tube 11 and outlet tube 12 are fixed to an inlet manifold 19 and an outlet manifold 20 by means of connecting pieces 17 and 18, respectively, as is indicated by soldered, brazed, or welded joints 21, 22.

At the sides of the inlet manifold 19 and the outlet manifold 20 remote from the inlet tube 11 and the outlet tube 12, respectively, the respective ends of two parallel, straight measuring tubes 23, 24 of the same inner diameter and the same wall thickness are fixed in said inlet and outlet tubes (the measuring tube 24 can only be seen in FIGS. 2 and 3).

A straight internal supporting element 25 is provided whose axis is parallel to that axis of symmetry of the measuring tubes which lies in the plane 26 containing the axes of the measuring tubes (see FIG. 2). The ends of the supporting element 25 are fixed in the inlet manifold 19 and outlet manifold 20, respectively. The thermal transition resistance from the supporting element 25 to the fluid is substantially lower than the thermal transition resistance from the support tube 14 to the fluid.

In the embodiment of FIG. 1, the axial stiffness of the supporting element 25 is at least two times, preferably ten to twenty times, greater than the axial stiffness of the measuring tubes 23, 24.

As the axis of the supporting element 25 is only parallel to that axis of symmetry of the two measuring tubes 23 24 which lies in the plane 26 containing the axes of the measuring tubes, it does not lie in this particular plane 26.

In the embodiment of FIG. 1, the supporting element 25 has an axial hole 25', through which the fluid flows. Advantageously, the axis of the hole 25' is equidistant from the axes of the two measuring tubes 23, 24. Preferably, the distance between the axes of the two measuring tubes 23, 24 is also equal to the distance from these axes to the axis of the hole 25', so that with respect to the lumina of the three tubes, a centrosymmetric arrangement is obtained, and that in each plane perpendicular to the tube axes, the centers of these lumina form the corners of an equilateral triangle.

As the simplest embodiment of the many possible embodiments of the supporting element 25, a third tube which is identical with one of the two measuring tubes 23, 24 but does not vibrate can be used, see below.

In the embodiments of the invention just explained, the fluid-conveying supporting element 25 bears only a formal resemblance to the two above-mentioned compensating tubes according to U.S. Pat. No. 4,653,332, since the conduit into which that mass flow meter is inserted is not axially aligned with the principal axis of the latter. The above-described problems regarding the plastic deformation of the diaphragms due to stress are not encountered in this prior art mass flow meter, because it does not have diaphragms or parts comparable thereto.

The invention can also be implemented with a supporting element through which the fluid does not flow, but which, by being implemented in the form of a so-called heat pipe for example, has a thermal conductivity two to three orders better than that of ordinary metals, or which is a particularly good thermal conductor as a result of other suitable measures.

A heat pipe comprises a tube which is closed at its ends and filled in a vacuum with a partly liquid, partly vaporous medium, such as water, methanol, ethanol, or the like, cf. UK Patent Application 2 194 324. Mounted on and along the interior wall of the tube is a wicklike body in whose capillary system the liquid phase travels from the cold to the warm end of the tube. Here the liquid evaporates, absorbing the necessary evaporation energy from the energy available outside the tube. This vapor flows in the lumen of the tube toward the cold of the latter, where it condenses, releasing the condensation energy to the environment of this tube end.

Mounted in the middle of the measuring tube 23 is a holder 27 for a vibration exciter which may be of the kind described in the two above-mentioned U.S. patents, for example. The vibration exciter excites only the measuring tubes 23, 24, but not the supporting element 25, into sympathetic vibrations, and is fed from driver electronics. The driver electronics may be of the kind described in applicant's own U.S. Pat. No. 4,801,897, for example, which is incorporated herein by reference.

The vibrations are excited, for example, in such a way that the measuring tube 23 vibrates in the plane 26 containing the axes of the measuring tubes 23, 24. The vibration of the measuring tube 23 is coupled via the inlet manifold 19 and the outlet manifold 20 to the other measuring tube 24, so that in the steady state, the two measuring tubes 23, 24 perform antiphase flexural vibrations. Instead of flexural vibrations, however, peristaltic vibrations, i.e., vibrations with periodic changes in tube cross section, or torsional vibrations of the measuring tubes are possible.

Mounted on the right and left of the holder 27 for the vibration exciter, preferably at equal distances from the holder 27, are holders 28, 29 of respective sensors for the vibrations of the measuring tubes 23, 24. These sensors may be, for example, optoelectronic sensors as are described in the above-cited U.S. Pat. No. 4,801,897, or electromagnetic sensors as are explained, for example, in European Patent 83 144.

The sensors are connected to evaluation electronics which determine the mass flow rate from the phase difference of the sensor signals and/or the density of the fluid from the vibration frequency. Evaluation electronics for the above-mentioned optoelectronic sensors are described, for example, in the journal "Automatisierungstechnische Praxis atp", 1988, No. 5, pages 224 to 230.

The partial flow through the supporting element 25, if fluid flows therethrough, is taken into account by the evaluation electronics, e.g., during the calibration of the individual mass flow meters, such that the total flow is indicated, or the partial flow is taken into account in another manner such that the total flow is indicated.

FIG. 1 also shows that in the vicinity of each of the ends of the measuring tubes 23, 24, i.e., not far from the points where these tubes are fixed in the inlet manifold 19 and outlet manifold 20, a vibration-node disk 30, 31 is attached which serves to improve the vibration characteristics of the measuring tubes 23, 24, namely by shifting the vibration nodes to points in front of the inlet manifold 19 and in front of the outlet manifold 20. If only the measuring tube 23 is excited as mentioned above, vibration coupling is effected by the vibration-node disks 30, 31, of course.

FIG. 2 is a section taken along line A—A of FIG. 1, on the scale of 2:1. It shows the above-mentioned positions of the two measuring tubes 23, 24 and the supporting element 25 relative to each other. As can be seen, the wall thickness of the supporting element 25 in the circumferential direction is not constant, but is determined by the circumference 32 of the inlet manifold 19 and by radii 33, 34 from the center of symmetry, which are separated from the measuring tubes 23, 24 by a distance slightly greater than the maximum vibration amplitude of the measuring tubes.

Through this design of the wall of the supporting element 25, the axial stiffness of the supporting element can be made at least two times, preferably ten to twenty times, greater than that of the measuring tubes 23, 24. Furthermore, this design of the wall of the supporting element 25 makes it possible to fulfill the condition that the thermal transition resistance from the supporting element 25 to the fluid should be substantially lower than the thermal transition resistance from the support tube 14 to the fluid.

FIG. 3 is a section taken along line B—B of FIG. 1, again on the scale of 2:1. It shows the position and shape of the above-mentioned vibration-node disk 30. One can see that it is only connected with the two measuring tubes 23, 24 while being separated from the supporting element 25 by a distance sufficient for noncontact.

Especially suitable materials for the measuring tubes are stainless steels or, for example, the iron alloy known by the mark Hastalloy. In the latter case, a tube of (expensive) Hastalloy which is identical with the measuring tubes 23, 24 will advantageously be positively inserted into a through hole of the supporting element 25 of ordinary, stainless (inexpensive) steel on cost grounds. This is readily possible since the coefficients of thermal expansion of these two materials are approximately equal. On the other hand, however, the two measuring tubes 23, 24 and the supporting element 25 may also be made of any of the other metals commonly used for mass flow meters with straight tubes, such as titanium or zirconium.

Due to the fact that in case of fluid-induced changes in temperature, particularly temperature jumps, the temperature of the supporting element 25 follows the temperature of the fluid very quickly compared to the temperature of the support tube 14, the measuring tubes 23, 24 and the supporting element 25 always have approximately the same temperature. Since this also results in equal thermal changes in the length of the two measuring tubes 23, 24 and the supporting element 25, the measuring tubes 23, 24 are subject to practically no axial tensile or compression stresses.

Because of the high stiffness of the supporting element 25, any plastic deformations of the connecting pieces 17, 18 have no influence on the measuring tubes and, thus, on the calibration of the mass flow meter.

What is claimed is:

1. A mass flow meter working on the Coriolis principle which is insertable into a conduit of a given diameter so as to be axially aligned with the conduit and through which flows a fluid to be measured, the flow meter comprising:
   an inlet tube and an outlet tube which serve to connect the flow meter with the conduit;
   an inlet manifold and an outlet manifold;
   an external support tube;
   means for coupling the external support tube to the inlet tube and outlet tube;

means for coupling the inlet and outlet tubes to the inlet and outlet manifolds;

two measuring tubes each having the same inner diameter and the same wall thickness;

means for coupling each measuring tube to the inlet manifold and outlet manifold;

an internal supporting element that is parallel to the measuring tubes, wherein the temperature of the internal supporting element changes more rapidly in response to the temperature changes of the fluid than the temperature of the external support tube;

means for coupling of the internal supporting element to the inlet manifold and outlet manifold;

a vibration exciter for vibrating the measuring tubes;

at least two sensors spaced along the measuring tubes for sensing the vibration of the measuring tubes and generating signals; and means for determining the mass flow rate from the phase difference of the signals.

2. A mass flow meter as claimed in claim 1 wherein the axial stiffness of the internal supporting element is at least twice as high as that of the measuring tubes.

3. A mass flow meter as claimed claim 1 wherein the internal supporting element is formed to include an axial hole therein having an inner diameter equal to the inner diameter of the measuring tubes and through which the fluid flows.

4. A mass flow meter as claimed in claim 3 wherein the wall thickness of the internal supporting element along a circumference is not constant.

5. A mass flow meter as claimed in claim 4 wherein the thickness of the wall of the internal supporting element remote from the measuring tubes is substantially greater than the thickness of the wall adjacent to the measuring tubes.

6. A mass flow meter as claimed in claim 3 wherein the axis of the hole in the internal supporting element is equidistant from the axis of each of the measuring tubes.

7. A mass flow meter as claimed in claim 3 wherein the distance between the axes of the two measuring tubes is equal to the distance from each of said axes to the axis of the hole in the internal supporting element.

8. A mass flow meter as claimed in claim 2 wherein the internal supporting element is formed to include an axial hole therein, and further comprising a tube whose material differs from that of the measuring tubes and has a coefficient of thermal expansion approximately equal to that of the measuring tubes, the tube being inserted into the hole in the internal supporting element.

9. A mass flow meter as claimed in claim 1 wherein the internal supporting element is a heat pipe.

10. A mass flow meter as claimed in claim 1 wherein the measuring tubes are excited by the vibration exciter into antiphase flexural vibrations in the plane containing the axes of the measuring tubes.

* * * * *